(12) United States Patent
Wyland

(10) Patent No.: US 6,912,673 B1
(45) Date of Patent: Jun. 28, 2005

(54) BUS ANALYZER UNIT WITH PROGRAMMABLE TRACE BUFFERS

(75) Inventor: David C. Wyland, Morgan Hill, CA (US)

(73) Assignee: Cradle Technologies, Inc., Sunnyvale, CA (US)

( * ) Notice: Subject to any disclaimer, the term of this patent is extended or adjusted under 35 U.S.C. 154(b) by 597 days.

(21) Appl. No.: 10/062,381

(22) Filed: Feb. 1, 2002

Related U.S. Application Data

(60) Provisional application No. 60/266,002, filed on Feb. 2, 2001.

(51) Int. Cl.$^7$ ................................................. G06F 11/00
(52) U.S. Cl. ..................................... 714/43; 714/45
(58) Field of Search ............................. 714/30, 39, 43, 714/45

(56) References Cited

U.S. PATENT DOCUMENTS

| | | | |
|---|---|---|---|
| 5,884,023 A | 3/1999 | Swoboda et al. | 395/183.06 |
| 5,887,167 A | 3/1999 | Sutton | 395/676 |
| 5,944,841 A | 8/1999 | Christie | 714/38 |
| 6,732,307 B1 * | 5/2004 | Edwards | 714/724 |
| 2002/0010882 A1 * | 1/2002 | Yamashita | 714/45 |

* cited by examiner

Primary Examiner—Bryce P. Bonzo
(74) Attorney, Agent, or Firm—Schneck & Schneck; Thomas Schneck; Nissa M. Strottman

(57) ABSTRACT

A Bus Analyzer Unit (BAU) for performing trace analysis on either or both the global bus (GBus) or the I/O bus of a semiconductor chip. The BAU has a GBus trace unit and an I/O bus trace unit, each with its own trace logic. Each unit has filters and comparators which determine what data is recorded and when it is recorded. Trace data recorded by the units is written to a programmable, circular trace buffer in local memory or an SDRAM. Each trace unit has two registers holding the start and end addresses of the trace buffer. Each unit has a next address register containing the next address to which data may be written. As data is written, the next address register is incremented. When the next address register equals the value in the end address register, the next address register is reloaded with the address in the start register.

25 Claims, 10 Drawing Sheets

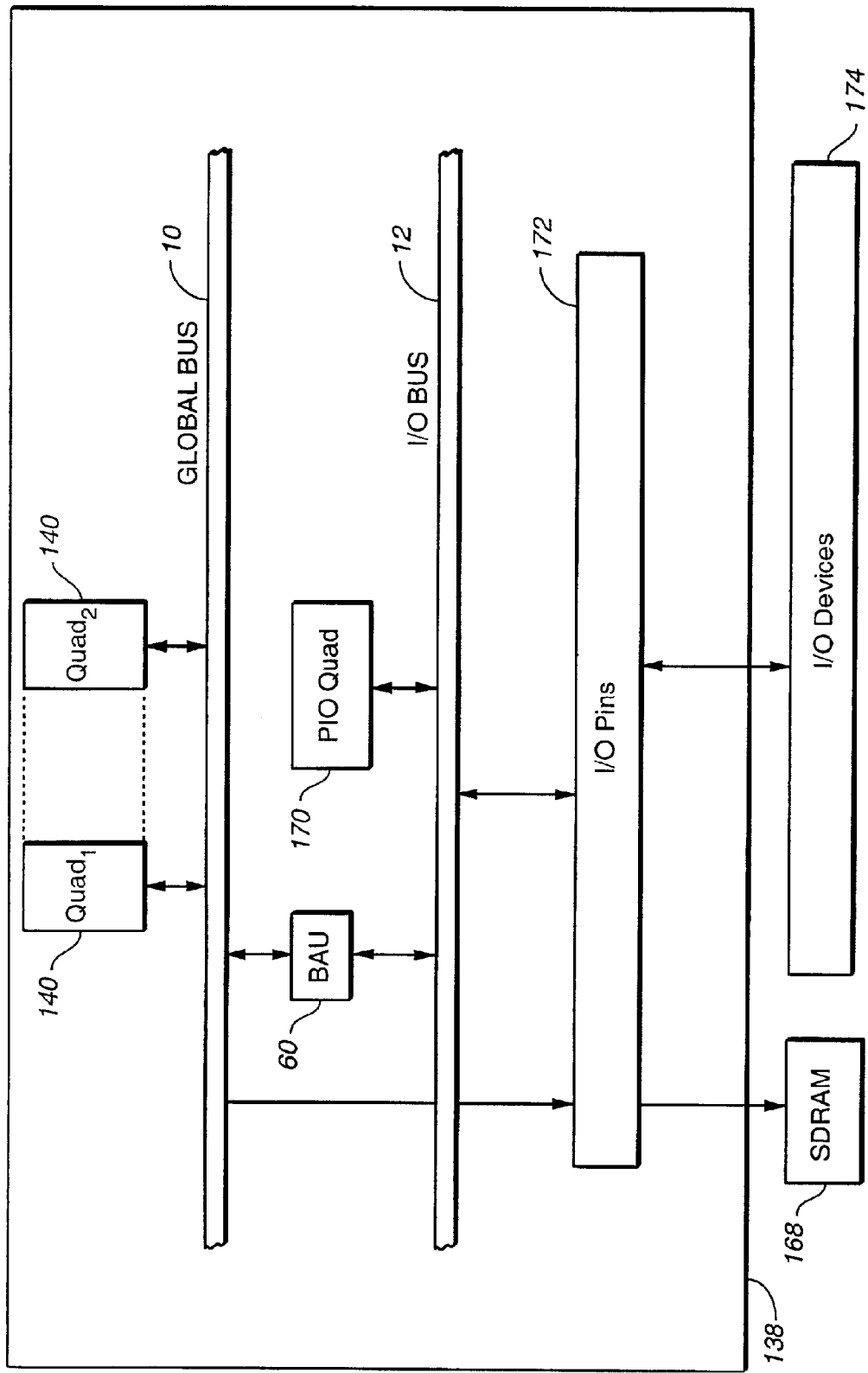
FIG._1A

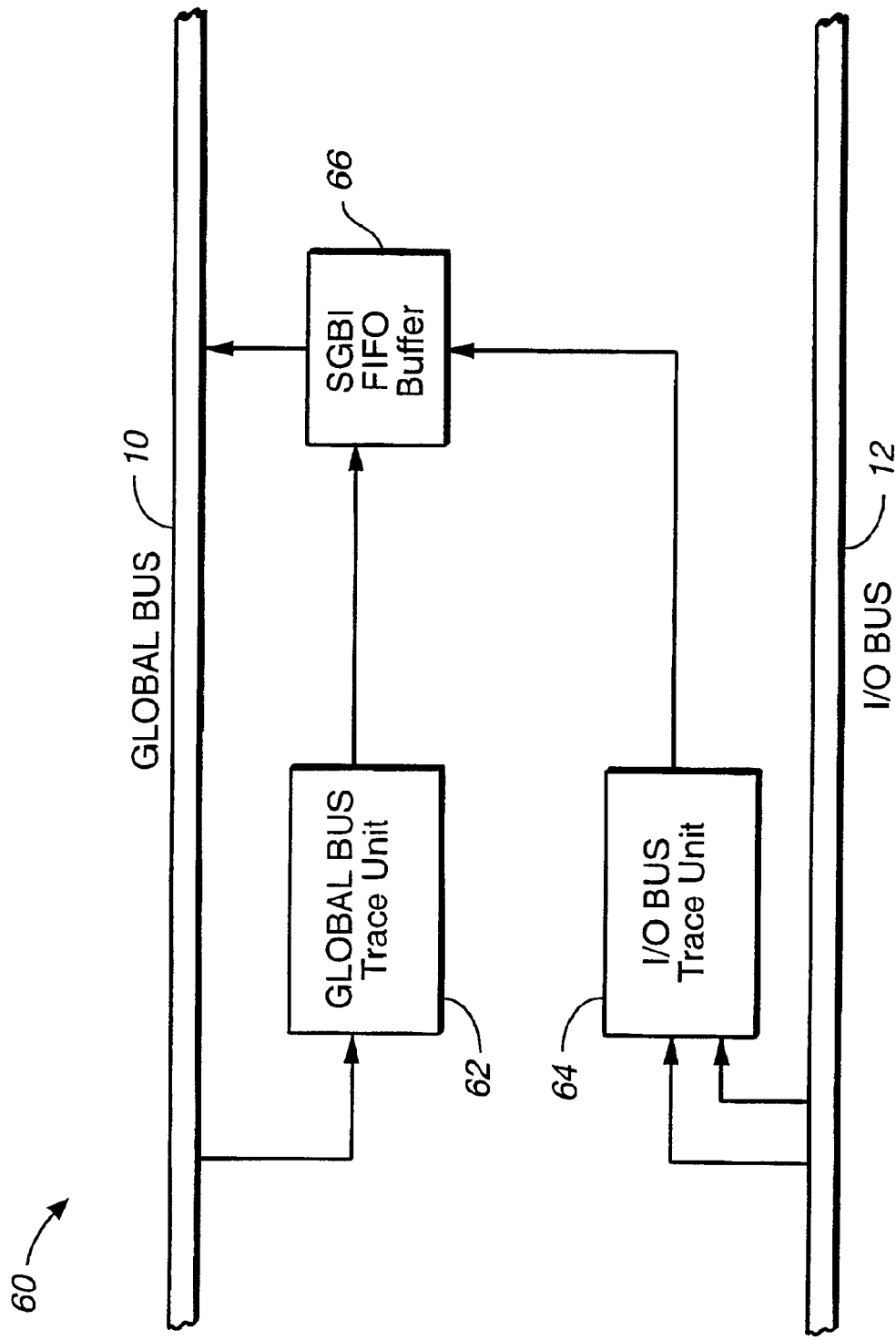
FIG._1B

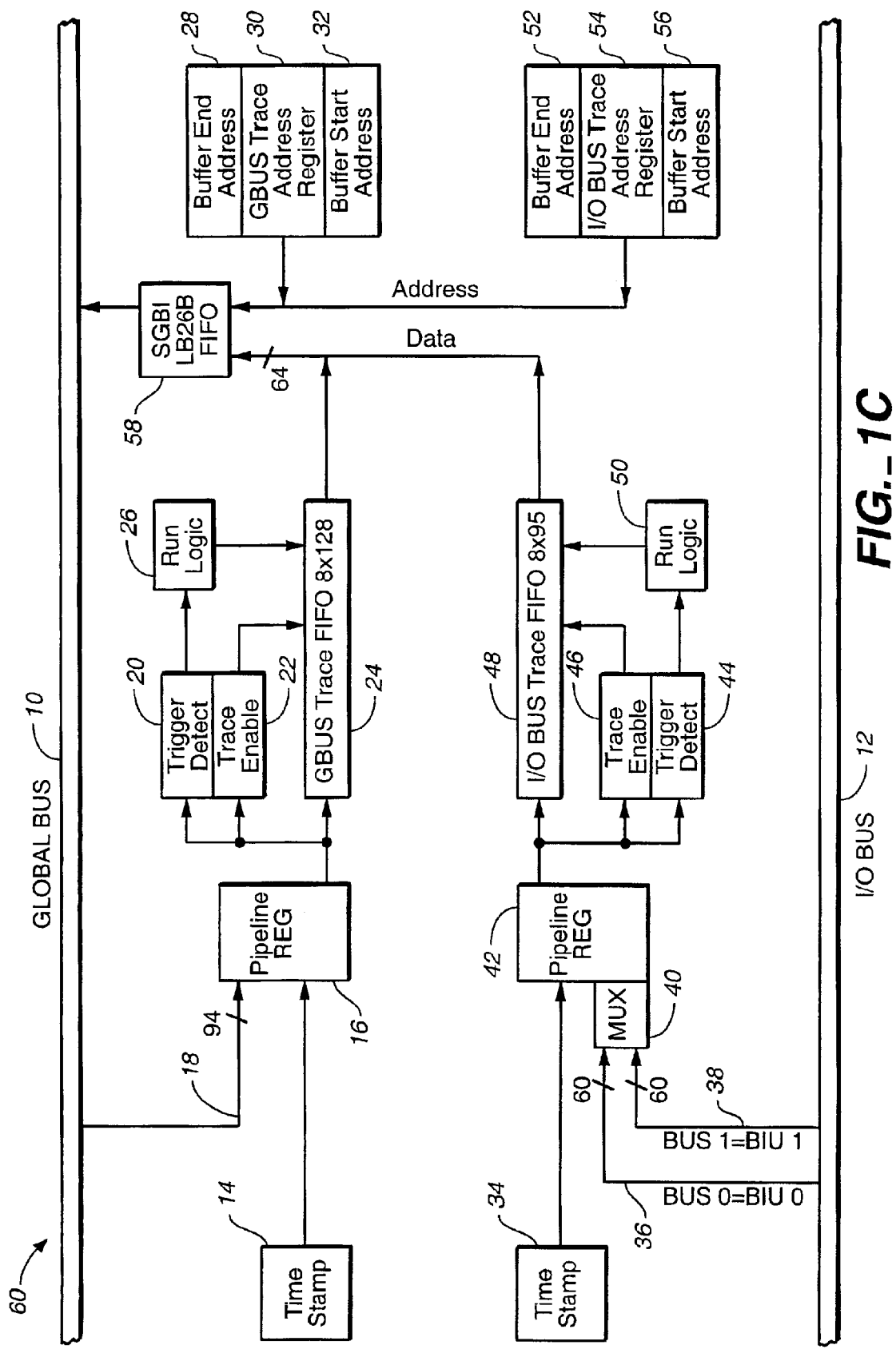
FIG. _1C

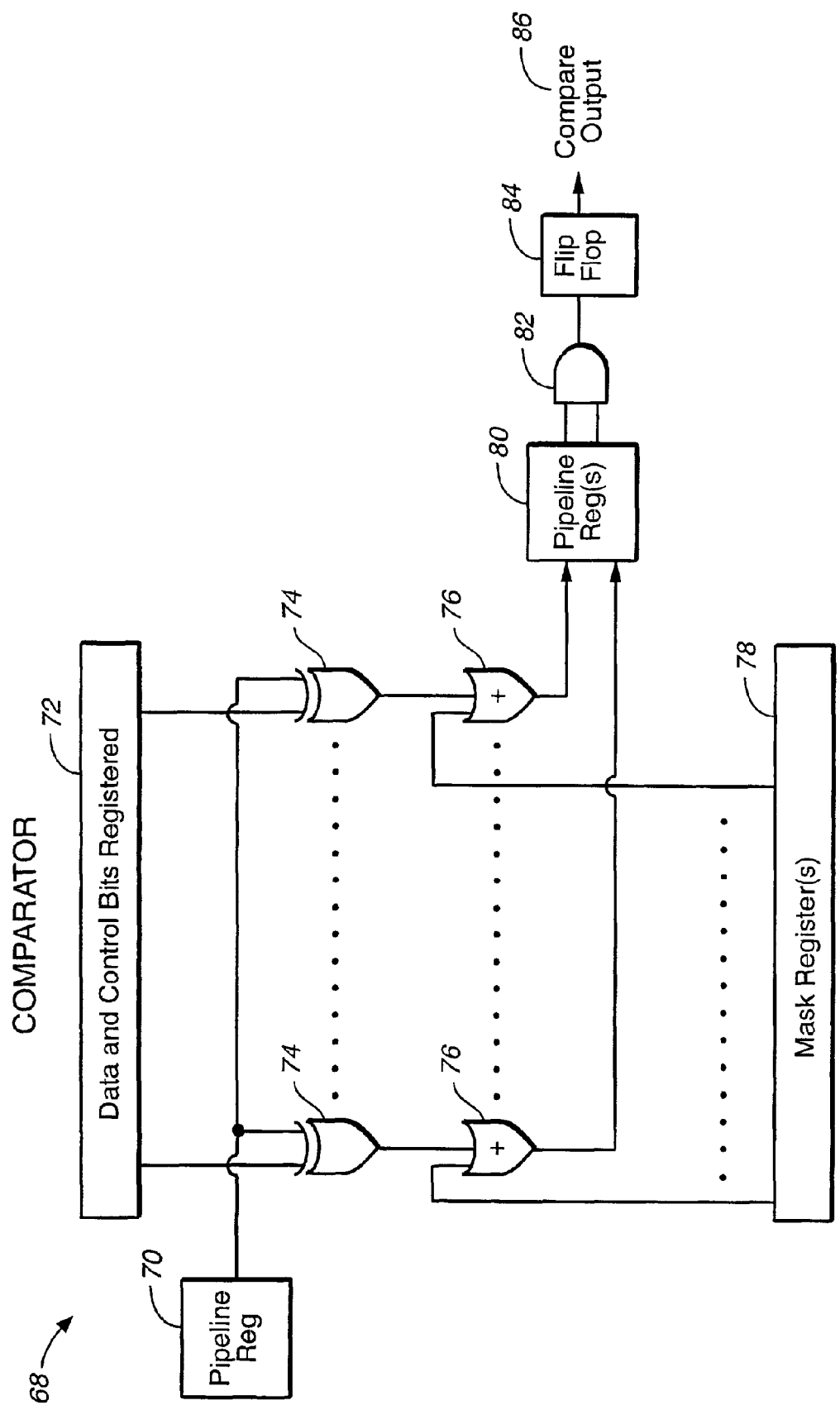
FIG._2

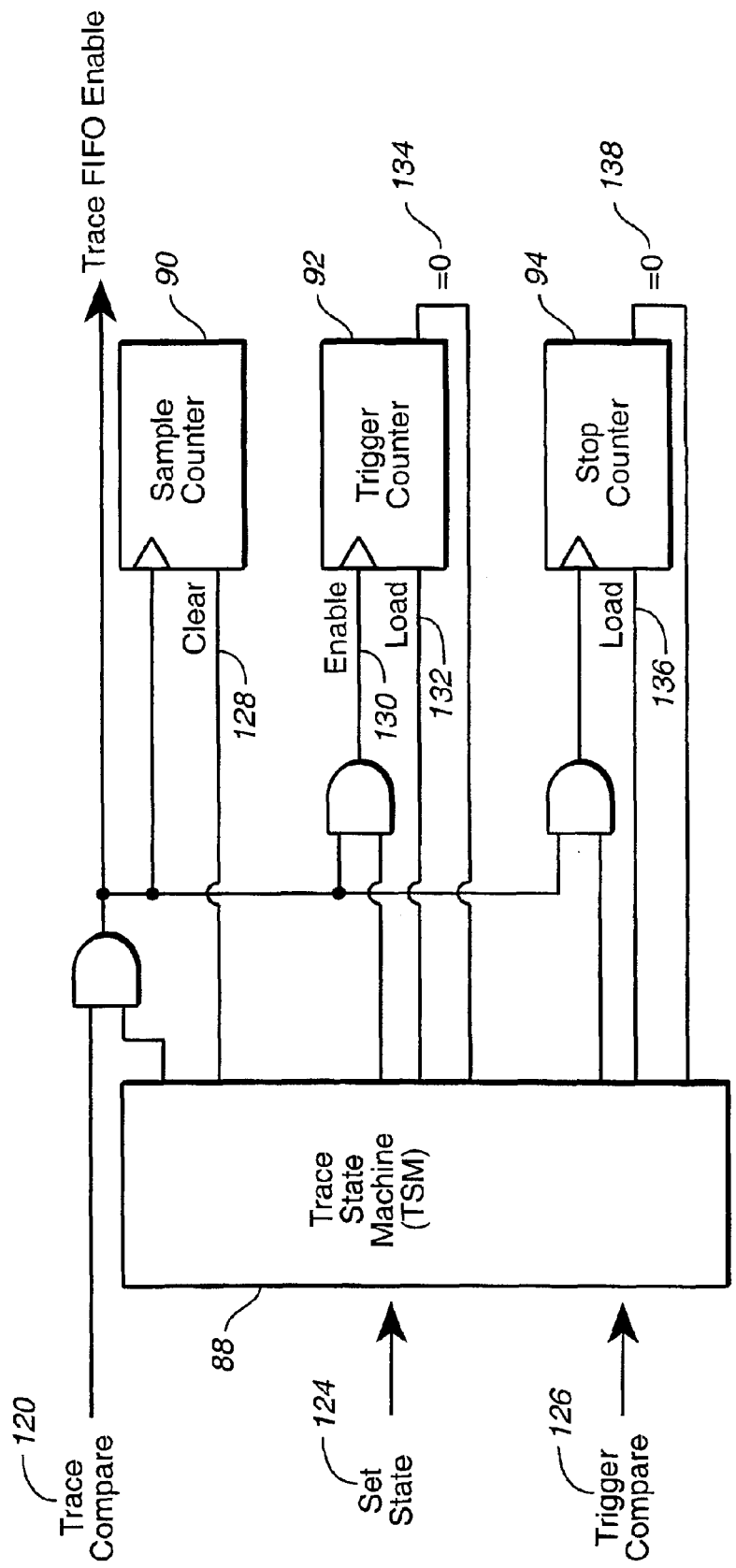
FIG._3A

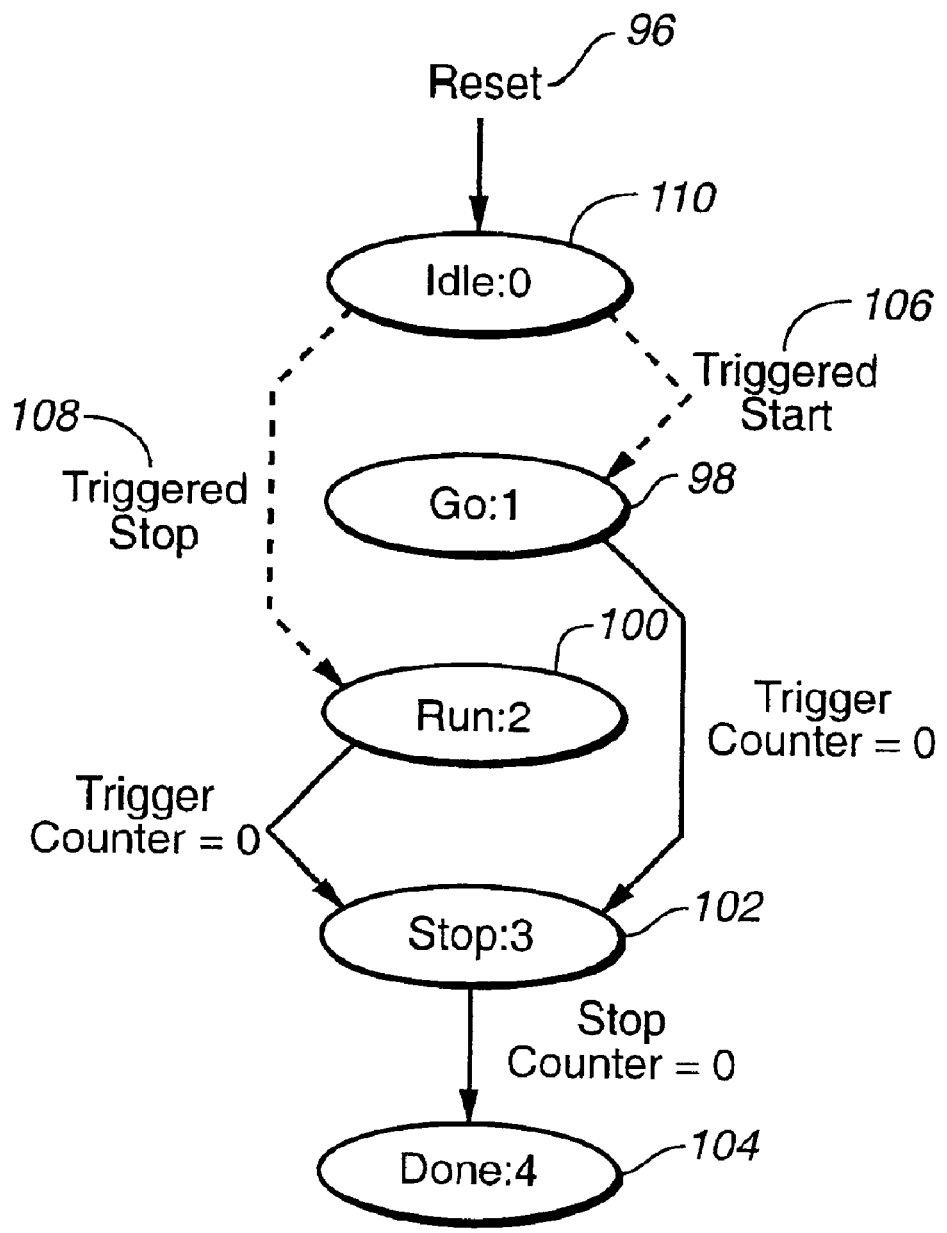
FIG._3B

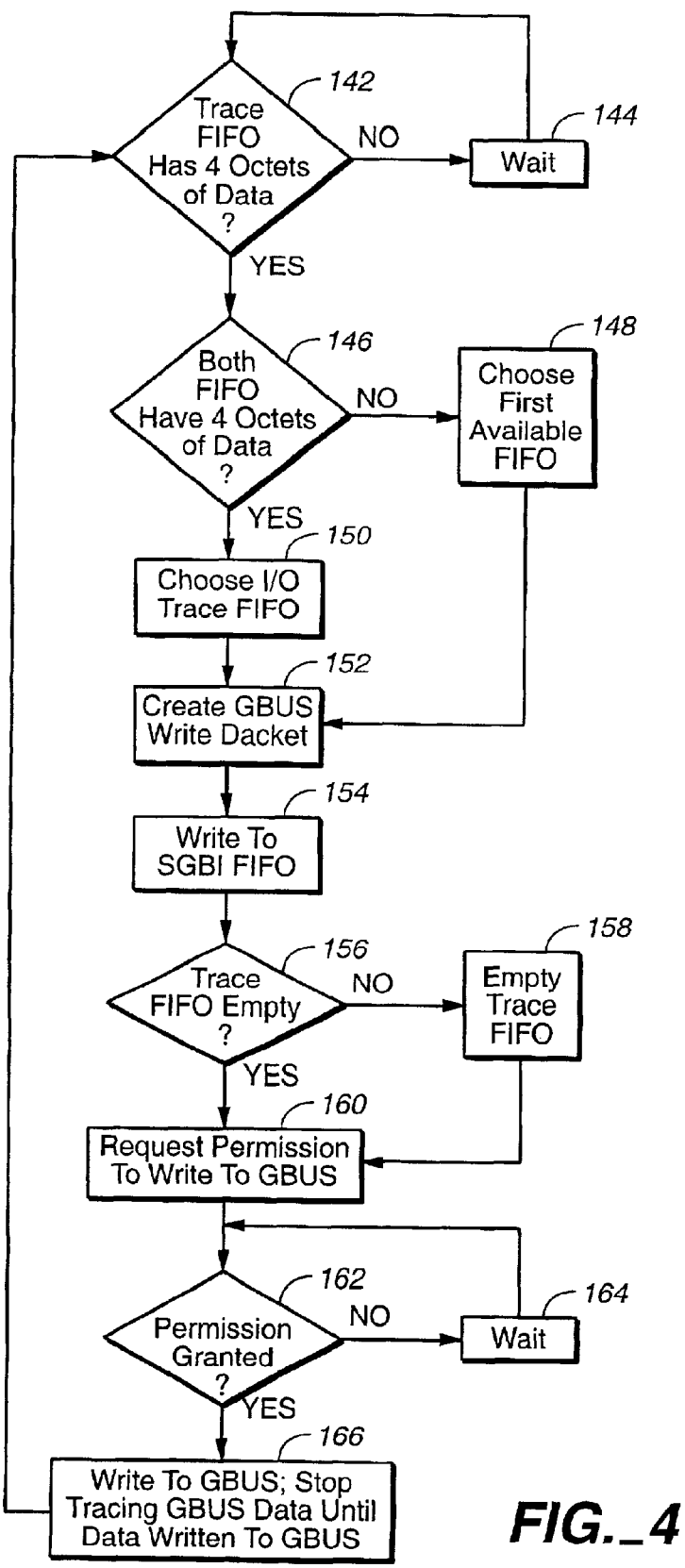
FIG._4

Bus Analyzer Register Map

| Address | Hex | Width | Function |
|---|---|---|---|
| 0 | 0 | 64 | GBus Filter Comparator GBus Data Bits 63:0 |
| 8 | 8 | 64 | GBus Filter Comparator Data Mask Bits 63:0 |
| 16 | 10 | 64 | GBus Filter Comp Control Bits: Dev code, Wd Type, BE's, CRJ, TACK |
| 24 | 18 | 64 | GBus Filter Comp Control Mask Bits |
| 32 | 20 | 64 | GBus Trigger Comparator GBus Data Bits 63:0 |
| 40 | 28 | 64 | GBus Trigger Comparator Data Mask Bits 63:0 |
| 48 | 30 | 64 | GBus Trigger Comp Control Bits: Dev code, Wd Type, BE's, CRJ, TACK |
| 56 | 38 | 64 | GBus Trigger Comp Control Mask Bits |
| 64 | 40 | 32 | GB Trace Buffer Start Address |
| 72 | 48 | 32 | GB Trace Buffer End Address |
| 80 | 50 | 32 | GB Trace Buffer Address Counter |
| 88 | 58 | 32 | GB Trace Stop Count |
| 96 | 60 | 32 | GB Trace Sample Count |
| 104 | 68 | 32 | GB Trigger Delay Count |
| 112-127 | 70-7F | | reserved |
| 128 | 80 | 64 | I/O Bus Filter Comparator Data Bits |
| 136 | 88 | 64 | I/O Bus Filter Comparator Data Mask Bits |
| 144 | 90 | 64 | I/O Bus Trigger Comparator Data and Control Bits |
| 152 | 98 | 64 | I/O Bus Trigger Comparator Data and Control Mask Bits |
| 160-191 | A0 | | reserved |
| 192 | C0 | 32 | I/O Bus Trace Buffer Start Address |
| 200 | C8 | 32 | I/O Bus Trace Buffer End Address |
| 208 | D0 | 32 | I/O Bus Trace Buffer Address Counter |
| 216 | D8 | 32 | I/O Bus Trace Stop Count |
| 224 | E0 | 32 | I/O Bus Trace Sample Count |
| 232 | E8 | 32 | I/O Bus Trigger Delay Count |
| 240-1023 | F0-3FF | | reserved |

FIG._5

GB Filter & Trigger Comparator Register Format

| Bits | No | Type | Function |
|---|---|---|---|
| 63:61 | 3 | RW | TSM State (Trigger comparator only) |
| 60 | 1 | RW | reserved |
| 59 | 1 | RW | Record GB Transactions: Record write data with GBus command |
| 58 | 1 | RW | Issue Broadcast Global Stop when trace stops (both I/O and GBus) |
| 57:56 | 2 | RW | Timestamp prescale value: 0 = 1, 1 = 16, 2 = 256 (Both I/O and GBus) |
| 55:30 | | | reserved |
| 29:27 | 3 | RW | Word Type: Idle, Cmd, etc. |
| 26:25 | 2 | RW | Command Reject Code |
| 24 | 1 | RW | TACK Error |
| 23:16 | 8 | RW | Byte Write Enables |
| 15:8 | 8 | RW | GBus Read Response Device Code |
| 7:0 | 8 | RW | Sub Device Code |

FIG._6

I/O Filter and Trigger Comparator Register Format

| Bits | No | Type | Function |
|---|---|---|---|
| 63:61 | 1 | RW | TSM State (Trigger comparator only) |
| 60 | 1 | RW | reserved |
| 59 | 1 | RW | I/O Bus Select for trace: BIU0/1 |
| 58:53 | 6 | RW | VIO Service Request Code |
| 52:51 | 2 | RW | VIO FIFO Enable/Reset |
| 50 | 1 | RW | VIO Service Request Active |
| 49 | 1 | RW | D Bus Cycle |
| 48:44 | 5 | RW | PIO/VIO Device Address |
| 43:38 | 6 | RW | Register Address |
| 37:36 | 2 | RW | R/W/S/C bits |
| 35:32 | 4 | RW | Byte Write Enables |

FIG._7

Global Bus Trace Data Format

| Octet | Bits | Function |
|---|---|---|
| 0 | 63:0 | GBUS Data |
| 1 | 63:30 | Time Stamp Counter (34 bits) |
| | 29:27 | Word Type: Idle, Cmd, etc. |
| | 26:25 | Command Reject Code |
| | 24 | TACK Error |
| | 23:16 | Byte Write Enables |
| | 15:8 | GBUS Read Response Device Code |
| | 7:0 | Sub Device Code |

*FIG._8*

I/O Bus Trace Data Format

| Octet | Bits | Function |
|---|---|---|
| 0 | 63:60 | Reserved |
| | 59 | I/O Bus Select for Trace; BIUD/1 |
| | 58:53 | VIO Service Request Code |
| | 52:51 | VIO FIFO Enable/Reset |
| | 50 | VIO Service Request Active |
| | 49 | D Bus Cycle |
| | 48:44 | PIO/VIO Device Address |
| | 43:38 | Register Address |
| | 37:36 | R/W/S/C bits |
| | 35:32 | Byte Write Enables |
| | 31:0 | I/O Bus Data Bits |
| 1 | 63:30 | Time Stamp Counter (34 bits) |
| | 29:0 | Reserved |

*FIG._9*

BUS ANALYZER UNIT WITH PROGRAMMABLE TRACE BUFFERS

CROSS-REFERENCE TO RELATED APPLICATION

This application claims the benefit of U.S. provisional application No. 60/266,002, filed Feb. 2, 2001.

FIELD OF THE INVENTION

This invention relates to bus analyzer units for semiconductor chips.

BACKGROUND OF THE INVENTION

Trace-analysis is one of the primary tools for developing and monitoring high performance semiconductor chips. In trace analysis, events of interest occurring during execution of a software program are monitored to determine how a hardware device performs during such events. It is also desirable to monitor a chip's performance after the debugging process is completed. Different types of information may be recorded during the trace, including instruction op-codes, memory addresses accessed, input, and output. The trace information is written to memory, where it can be analyzed by the user.

U.S. Pat. No. 5,944,841 describes an instruction tracing mechanism where records of instruction tracing are stored to a trace buffer. A tracer pointer points to entries in the tracer buffer. When the trace buffer is full, the trace data is written to another storage device, such as a disk drive or another computer system.

U.S. Pat. No. 5,884,023 describes a tracing scheme where trace information is written to a predetermined trace memory when a predefined trigger occurs. When the trace memory is full, the data in the trace memory is transferred to the test host, thus freeing space in the trace memory.

Since the trace memory is shared with the memory required to store a software application, it would be advantageous to be able to place the trace buffer anywhere and adjust it's size programmatically. None of the prior art discusses a mechanism where the trace buffer's size may be adjusted programmatically. It is an object of the invention to provide a programmable circular buffer for storing trace data.

Another object of the invention is to provide a bus analyzer capable of performing logic analyzer functions on both the global bus and the I/O bus of a chip.

SUMMARY OF THE INVENTION

The Bus Analyzer Unit (BAU) of the present invention monitors either or both the global bus (GBus) and I/O bus of a semiconductor chip. Trace data recorded by the BAU is then written to a programmable trace buffer either in local memory on the semiconductor chip or an SDRAM. Since the trace buffer is programmable, it may be placed anywhere and its size may be altered as required.

The BAU possesses a GBus trace unit and an I/O bus trace unit. Each trace unit has its own trace logic. Filters and comparators for each trace unit are used to determine what data is recorded and when it is recorded. Trace data is recorded to a trace FIFO. From there, the unit writes data to the programmable trace buffer, whose location is determined by a start address register and an end address register for each unit. The unit's next address register indicates where data is to be written next and is incremented as data is written. When the value of the next address register equals or exceeds the value of the end address register, the next address register is reloaded with the value of the start address register. When recording is stopped, the value of the next address register indicates the oldest contents of the buffer; the previous address contains the newest. contents of the buffer. This approach provides a programmable circular buffer for storing trace data from both the global bus and the I/O bus.

BRIEF DESCRIPTION OF THE DRAWINGS

FIG. 1a is a block diagram showing the bus analyzer unit as part of a semiconductor chip.

FIGS. 1b and 1c are block diagrams of a bus analyzer unit shown in FIG. 1a.

FIG. 2 is a diagram of a comparator of the bus analyzer unit shown in FIGS. 1a, 1b, and 1c.

FIG. 3a is a block diagram of trigger logic employed by the bus analyzer unit shown in FIGS. 1a, 1b, and 1c.

FIG. 3b is a chart showing states and state actions of a trace state machine employed by the bus analyzer unit shown in FIGS. 1a, 1b, and 1c.

FIG. 4 is a flow chart showing exemplary steps for writing trace data to a trace buffer performed by the bus analyzer unit shown in FIGS. 1a, 1b, and 1c.

FIG. 5 is an example of a register map for the bus analyzer unit shown in FIGS. 1a, 1b, and 1c.

FIG. 6 is an example of a global bus filter and trigger comparator register for the bus analyzer unit shown in FIGS. 1a, 1b, and 1c.

FIG. 7 is an example of an I/O bus filter and trigger comparator register for the bus analyzer unit shown in FIGS. 1a, 1b, and 1c.

FIG. 8 is an example of a global bus trace data format chart for the bus analyzer unit shown in FIGS. 1a, 1b, and 1c.

FIG. 9 is an example of an I/O bus trace data format chart for the bus analyzer unit shown in FIGS. 1a, 1b, and 1c.

BEST MODE FOR CARRYING OUT THE INVENTION

With reference to FIG. 1a, a Bus Analyzer Unit (BAU) 60 resides with other devices on a chip 138. In this embodiment, the chip 138 is a UMS0103, a multiprocessor manufactured by cradle Technologies, Inc., a simplified version of which is discussed here. The BAU 60 performs trace analysis on both the global bus (GBus) and the I/O bus 12. (I/O devices 174, such as DRAM 168, communicate with the chip 138, via I/O pins 172. The PIO Quad 170 is a general-purpose programmable hardware unit allowing implementation of most I/O devices 174 in software. Global bus devices, such as DRAM memories, global registers, and processing units, communicate with each other through the GBus 10. The GBus 10 and methods for transferring data are discussed in application Ser. No. 09/968,467, filed Sep. 28, 2001; the teachings of this application are incorporated by reference.) The trace data is then written to either local memory on the GBus 10 such as the Quad 140 (a cluster of processors and memory) in the chip 138 or an SDRAM 168. In the embodiment described below, trace data is written to local memory.

Referring to FIG. 1b, the BAU 60 performs trace analysis on both the GBus 10 and the I/O bus 12. Accordingly, the BAU 60 has two trace units—one trace unit 62 for the GBUS 10 and one trace unit 64 for the I/O bus 12. Each of the trace units 62, 64 records the trace data and writes it to the standard global bus interface (SGBI) local bus to global bus (LB2GB) FIFO buffer 66, where it is stored until written to local memory on the GBus 10.

Referring to FIG. 1c, data 18 from the GBus 10 is inputted into a pipeline register 16 and time stamped 14. The GBus unit contains means 20, 22, 26 (collectively referred to as "trace control logic") for detecting trigger events, enabling a trace, and determining what and when data should be traced, i.e., written to the GBus FIFO 24. These means will be discussed in further detail in FIGS. 2, 3a, and 3b, below. Data written to the GBus FIFO 24 is then transferred via trace control logic to an associated trace buffer in memory, in this case the SGBI FIFO buffer 66. The GBus trace address register 30 defines where the data is written. The buffer start 32 and end 28 addresses define the boundaries of where trace data may be written. As trace data is written to the buffer 58, the address register 30 is incremented by the number of octets of trace data moved to memory 58. After the register 30 has been incremented, the address register 30 value is compared to the buffer end address 28. If the address register 30 value is equal to or greater than the buffer end address 28, the address register 30 is loaded with the buffer start address 32. This approach creates a circular buffer. The criterion for choosing a buffer size is the size of the time-window the user wishes to view (time-forward as well as time-back) when the sampling stops, as discussed below in FIGS. 2, 3a, and 3b.

Similarly, the BAU 60 can also record data from the I/O bus 12. (The BAU 60 can record data from either the GBus or the I/O bus or it can record from both buses.) Data 36, 38 from the I/O bus 12 is multiplexed 40 into a pipeline register 42 and time stamped 34. The I/O bus unit contains means 44, 46, 50 (collectively referred to as "trace control logic") for detecting trigger events, enabling a trace, and determining what and when data should be traced, i.e., written to the I/O bus FIFO 48. These means will be discussed in further detail in FIGS. 2, 3a, and 3b, below. Data written to the I/O bus FIFO 48 is then transferred via trace control logic to an associated trace buffer in memory, in this case the SGBI LB2GB FIFO buffer 66. The I/O bus trace address register 54 defines where the data is written.

The buffer start 56 and end 52 addresses define the boundaries of where trace data may be written. As trace data is written to the buffer 58, the address register 54 is incremented by the number of octets of trace data moved to memory 58. After the register 54 has been incremented, the address register 54 value is compared to the buffer end address 52. If the address register 54 value is equal to or greater than the buffer end address 52, the address register 54 is loaded with the buffer start address 56. As noted above, this approach creates a circular buffer.

As noted above in FIG. 1b, the BAU has means for detecting trigger events, enabling a trace, and determining what and when data should be recorded. The BAU has filter trace enable and trigger comparators for the GBus and I/O bus. The trace enable comparator selects data put into the corresponding trace FIFO. The trigger comparator determines when to start or stop writing data to the trace buffer.

A comparator is illustrated in FIG. 2. In this example, the comparator 68 is a filter trace enable comparator. The comparator 68 has a data and control bits, or comparator, register 72 indicating what data is to be recorded. Each bit of the comparator register 72 is compared to the corresponding bit of the bus it monitors. These corresponding bits are fed to the comparator by the pipeline register 70. The comparison is accomplished through the use of an Exclusive OR gate 74. A corresponding bit from the mask register(s) 78 enable the results of the comparison, which are fed to another pipeline register(s) 80. (It is necessary to pipeline the data fed to the AND gate because the AND gate is 94 bits wide in the GBus case and the comparison must be done in a GBus clock cycle. The AND can be pipelined as long as the data to the trace FIFO is equally pipelined because the trace data has to arrive at the trace FIFO at the same time as the decision to put the data into the FIFO is made.) The masked results are then fed to an AND gate 82, the results of which are fed to a flip flop 84, to generate the compare output 86, which indicates whether data should be written to the trace FIFO.

As shown in FIG. 3a, each trace unit has a trace state machine (TSM) 88, a sample counter 90, a trigger counter 92, and a stop counter 94. The TSM controls the BAU trace operation. The sample counter 90 counts the number of valid samples written to the trace buffer. The trigger counter 92 provides an N trigger delay before starting or stopping trace recording, depending on the recording mode, triggered start or triggered stop (described below in FIG. 3b), the BAU is employing. Basically, the trigger counter 92 provides a method to trigger the start or stop of data recording on the "Nth" trigger event rather than always triggering on the first trigger event. The stop counter 94 provides a delay between the decision to stop tracing and the actual end of trace recording, enabling the user to record trace data around the triggering event.

FIG. 3b describes the TSM state chart and the various actions associated with each state. The TSM is initially in an IDLE state 110, where the sample counter is cleared, and the stop and trigger counters are loaded. The TSM is then set to either the GO state 98 or the RUN state 100. The GO state 98 corresponds to the triggered start recording mode 106 while the RUN state corresponds to the triggered stop mode 108. In triggered start mode 106, the trigger counter provides an N trigger delay before starting trace recording; in the triggered stop mode 108, the trigger counter provides an N trigger delay before stopping trace recording.

When the TSM is in GO state 98, the trigger counter is enabled. The BAU waits in the GO state 98 for N triggers before starting, at which point it enters the STOP state 102. In other words, the trigger counter is zero before entering the STOP state 102. Once the TSM is in the STOP state 102, the sample trace, the sample counter, and the stop counter are enabled. The BAU accumulates trace data until the stop counter reaches zero, at which point the TSM moves to the DONE state 104. In the DONE state, the sample trace and sample and trigger counter are disabled. The TSM is then reset 96.

When the TSM is in RUN state 100, the trigger counter, sample trace, and the sample counter are enabled. Trace data is accumulated in the RUN state until N trigger compares (described above in FIG. 2) drive the trigger counter to zero, when the TSM is set to the STOP state 102, at which point the stop counter is enabled. Trace data continues to be accumulated until the stop counter reaches zero, after which the TSM enters the DONE state 104. In the DONE state, the sample trace and sample and trigger counter are disabled. The TSM is then reset 96.

The TSM state may be changed at any time by writing a new state to the TSM. This may be done, for example, to prematurely end a trace or effectively force a trigger event.

Referring again to FIG. 3a, a "positive" result from a trace comparison 120 and enabling signal from the TSM 88 enables trace recording to the FIFO 122. The enable signal from the TSM 88 is dependent on what state the TSM is set to 124 and whether the trigger comparator 126 signals a trigger event has occurred. When the TSM is in the IDLE state, the sample counter 90 is cleared 128 and the trigger counter 92 and stop counter 94 are loaded 132, 136. The trigger counter 92 is enabled 130 by signals from the TSM 88 and a positive result from the trace comparison 120. The sample trace counter 90 and the stop counter 94 are enabled depending on the TSM 88 state. When the trigger counter 92 is zero 134, the TSM 88 enters the STOP state. When the stop counter 94 is zero 138, the TSM 88 enters the DONE state.

FIG. 4 details how trace data is transferred by the trace logic from the trace FIFOs and written to local memory. As noted above in FIG. 1b, the data in both trace FIFOs is transferred to the SGBI LB2GB FIFO before it is written to local memory. Referring again to FIG. 4, the trace logic waits until a trace FIFO has four octets of data available (blocks 142, 144). If both trace FIFOs are ready at the same time, the trace logic will choose the I/O trace FIFO first (blocks 146, 150). Otherwise, the trace logic will choose the first trace FIFO with the available four octets of data (block 148).

When the Run bit is cleared at the end of a trace, the amount of data in the FIFO generally will not be an exact multiple of 4 octets. The trace logic first writes out trace FIFO data in 4-octet blocks to memory if there are 4 octets or more in the FIFO (block 152). Then, if there is still some data in the trace FIFO, the trace logic flushes the contents of the trace FIFO to memory regardless of the amount of data remaining in the trace FIFO. If less than four octets of data are in the trace FIFO, the trace logic will generate single or double octet writes in order to empty the trace FIFO (blocks 156, 158).

The BAU can generate trace data from the two buses faster than it can write octets of data to memory. To solve this problem, the BAU is the highest priority GBus device on the chip except for the Bus Idle Default Device (BIDD), which drives the global bus when it is idle. When the SGBI LB2GB FIFO contains trace data, it will request permission to write to the GBus (block 160) and will write the data to the GBus when it receives permission (blocks 162, 164, 166). The BAU does not trace data on the GBus when it is writing to the GBus, thereby providing an automatic control of GBus tracing (block 166). However, tracing from the I/O bus cannot be stopped. The I/O bus can generate octets of trace data at about half the bandwidth of the GBus. As noted above, priority is given to transferring I/O trace data from the trace FIFO to the SGBI LB2GB FIFO, largely because trace data for the I/O bus can be generated more rapidly than for the GBus. Therefore, the Gbus trace FIFO must be deep enough to buffer the trace data that accumulates until permission to write to the GBus is granted to the BAU. When the SGBI LB2GB FIFO has finished writing to the GBus, it determines whether one of the trace FIFOs has another four octets of data available (block 142).

While the BAU is an independent unit, it is linked with the PIO Quad (see FIG. 1a). The BAU monitors the PIO Quad I/O bus and the BAU control registers are mapped into the PIO Quad address space. With reference to FIG. 5, the map 176 shows a possible configuration of the BAU registers, indicating the address 178, hex 180, width 182, and function 184 of the BAU control registers.

With reference to FIGS. 6 and 7, the comparator registers define the GBus and the I/O bus bit values and masks for comparison. The data and control comparator registers define bit values and the mask bits enable comparison of the corresponding data bits. In FIG. 6, one potential configuration of a GBus filter and trigger comparator register map 186 shows the bits 188, number of bits 190, type 192, and function 194 of the bit and mask registers for the GBus control bits. The GBus 64-bit data compare and data mask registers are 64-bit registers. Each bit of the registers corresponds to a GBus data bit.

Similarly, in FIG. 7 a potential configuration of the I/O filter and trigger comparator register map 196 for the I/O bus bit and mask registers shows the bits 198, number of bits 200, type 202, and function 204 of the bits. In this embodiment, bit 59 selects which of the I/O bus segments (BIU 0 or BIU 1) to trace.

With reference to FIG. 8, the BAU records the trace data for the GBus as pairs of octets. In one configuration, the first octet of data recorded is data from the GBus and the second octet contains the GBus control signals and a time stamp counter which indicates when the sample was taken. This configuration is illustrated by a GBus trace data format chart 206, which indicates octets of data 208, the bits in the octets of data 210, and the function of those bits 212.

With reference to FIG. 9, the I/O bus records trace data as pairs of octets. The first octet contains the 32-bit data and the control signals from the I/O bus. The second octet contains a time stamp counter indicating when the sample was taken. A possible configuration is shown in I/O bus trace data format chart 214, indicating octets of data 216, the bits in the octets of data 218, and the function of those bits 220.

What is claimed is:

1. A semiconductor chip having a Bus Analyzer Unit ("BAU") for trace analysis on both a global bus and an I/O bus of the semiconductor chip, said BAU comprising:
 a) a global bus trace unit including:
  i) a global bus trace memory configured to store trace data from the global bus;
  ii) a global bus trace control logic in electrical communication with the global bus trace memory and configured to transfer trace data from the global bus trace memory to a first circular buffer;
  iii) a global bus address register in electrical communication withe the global trace memory and configured to identify an available block of memory where trace data may be written to the first circular buffer; and
  iv) a first pair of registers in electrical communication with the global bus address register and configured to identify start and end addresses of the first circular buffer, wherein the first pair of registers may be programmed to provide a variably-sized first circular buffer; and
 b) an I/O bus trace unit including:
  i) an I/O bus trace memory configured to store trace data from the I/O bus;
  ii) an I/O bus trace control logic in electrical communication with the I/O bus trace memory and configured to transfer trace data from the I/O bus trace memory to a second circular buffer;
  iii) an I/O bus address register in electrical communication with the I/O bus trace memory and configured to identify an available block of memory where trace data may be written to the second circular buffer; and
  iv) a second pair of registers in electrical communication with the I/O bus address register and configured to identify start and end addresses of the second circular buffer, wherein the second pair of registers may be programmed to provide a variably-sized second circular buffer.

2. The BAU of claim 1 wherein each trace control logic has a filter comparator configured to select what data is recorded.

3. The BAU of claim 1 wherein each trace control logic has a trigger comparator configured to select when to record data.

4. The BAU of claim 1 wherein each trace control logic has means for incrementing the corresponding address counter by a number equal to octets of trace data moved to the corresponding circular buffer.

5. The BAU of claim 1 wherein each trace unit has a trace state machine configured to control the BAU trace operation, each trace state machine in electrical communication with the corresponding bus trace memory.

6. The BAU of claim 1 wherein each trace unit has a sample counter configured to count the number of samples in each trace memory, each sample counter in electrical communication with the corresponding bus trace memory.

7. The BAU of claim 1 wherein each trace unit has a trigger counter configured to provide an N trigger delay before trace recording begins, each trigger counter in electrical communication with the corresponding bus trace memory.

8. The BAU of claim 1 wherein each trace unit has a trigger counter configured to provide an N trigger delay before trace recording ends, each trigger counter in electrical communication with the corresponding bus trace memory.

9. The BAU of claim 1 wherein each trace unit has a stop counter configured to provide a delay between a decision to stop tracing and an end to trace recording, each stop counter in electrical communication with the corresponding bus trace memory.

10. The BAU of claim 1 wherein each circular buffer is in local memory.

11. The BAU of claim 1 wherein each circular buffer is a SDRAM.

12. The BAU of claim 1 wherein each bus trace memory is a FIFO.

13. The BAU of claim 1 wherein the global trace control logic has means for incrementing the global bus address register by a number equal to octets of trace data moved from the global bus trace memory to the first circular buffer and setting the global bus address register to the start address of the first circular buffer if, after the global bus address register is incremented, the global bus address register value is equal to or exceeds the end address of the first circular buffer.

14. The BAU of claim 1 wherein the I/O trace control logic has means for incrementing the I/O bus address register by a number equal to octets of trace data moved from the I/O bus trace memory to the second circular buffer and setting the I/O bus address register to the start address of the second circular buffer if, after the I/O bus address register is incremented, the I/O bus address register value is equal to or exceeds the end address of the second circular buffer.

15. A semiconductor chip having a Bus Analyzer Unit ("BAU") for trace analysis on both a global bus and an I/O bus of the semiconductor chip, said BAU comprising:

a) a global bus trace unit including:
   i) a global bus trace memory configured to store trace data from the global bus;
   ii) a global bus trace control logic in electrical communication with the global bus trace memory and configured to transfer trace data from the global bus trace memory to a first circular buffer;
   iii) a first pair of registers in electrical communication with the global bus trace memory and configured to identify start and end addresses of the first circular buffer, wherein the first pair of registers may be programmed to provide a variably-sized circular buffer; and
   iv) a global bus address register in electrical communication with the global bus trace memory and configured to identify an available block of memory where trace data may be written to the first circular buffer, wherein the global trace control logic also has means for incrementing said global bus address register by a number equal to octets of trace data moved from the global bus trace memory to the first circular buffer and setting the global bus address register to the start address of the first circular buffer if, after the global bus address register is incremented, the global bus address register value is equal to or exceeds the end address of the first circular buffer; and b) an I/O bus trace unit including:
   i) an I/O bus trace memory configured to store trace data from the I/O bus;
   ii) an I/O bus trace control logic in electrical communication with I/O bus trace memory and configured to transfer trace data from the I/O bus trace memory to a second circular buffer;
   iii) a second pair of registers in electrical communication with the I/O bus trace memory and configured to identify start and end addresses of the second circular buffer, wherein the second pair of registers may be programmed to provide a variably-sized circular buffer; and
   iv) an I/O bus address register in electrical communication with the I/O bus trace memory and configured to identify an available block of memory where trace data may be written to the second circular buffer, wherein the I/O bus trace control logic also has means for incrementing said I/O bus address register by a number equal to octets of trace data moved from the I/O bus trace memory to the second circular buffer and setting the I/O bus address register to the start address of the second circular buffer if, after the I/O bus address register is incremented, the I/O bus address counter value is equal to or exceeds the end address of the second circular buffer.

16. The BAU of claim 15 wherein each trace control logic has a filter comparator configured to select what data is recorded.

17. The BAU of claim 15 wherein each trace control logic has a trigger comparator configured to select when to record data.

18. The BAU of claim 15 wherein each trace unit has a trace state machine configured to control the BAU trace operation, each trace state machine in electrical communication with the corresponding bus trace memory.

19. The BAU of claim 15 wherein each trace unit has a sample counter configured to count the number of samples in each trace memory, each sample counter in electrical communication with the corresponding bus trace memory.

20. The BAU of claim 15 wherein each trace unit has a trigger counter configured to provide an N trigger delay before trace recording begins, each trigger counter in electrical communication with the corresponding bus trace memory.

21. The BAU of claim 15 wherein each trace unit has a trigger counter configured to provide an N trigger delay before trace recording ends, each trigger counter in electrical communication with the corresponding bus trace memory.

22. The BAU of claim 15 wherein each trace unit has a stop counter configured to provide a delay between a decision to stop tracing and an end to trace recording, each stop counter in electrical communication with the corresponding bus trace memory.

23. The BAU of claim 15 wherein each circular buffer is in local memory.

24. The BAU of claim 15 wherein each circular buffer is a SDRAM.

25. The BAU of claim 15 wherein each bus trace memory is a FIFO.

* * * * *